Sept. 13, 1932.    M. J. SHOEMAKER    1,877,606
BOTTLE CAP
Filed Nov. 8, 1929
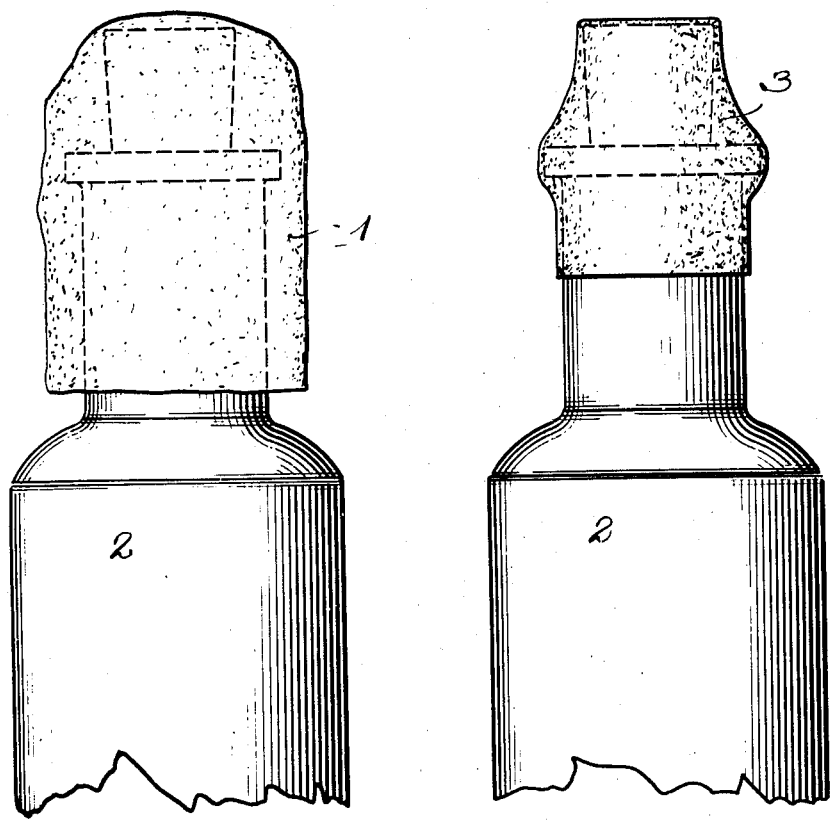

Patented Sept. 13, 1932

1,877,606

UNITED STATES PATENT OFFICE

MILTON J. SHOEMAKER, OF MADISON, WISCONSIN, ASSIGNOR TO C. F. BURGESS LABORATORIES, INC., OF MADISON, WISCONSIN, A CORPORATION OF DELAWARE

BOTTLE CAP

Application filed November 8, 1929. Serial No. 405,598.

My invention relates to improvements in coverings such as bottle caps and bands for bottles, jars, and the like, and other articles which may be placed in position while wet, with or without stretching, and then allowed to shrink and dry into final position.

Bands and bottle caps are now the chief articles of this type, but it will be obvious from the following description that other forms may be made within the scope of the invention, such as bags, ribbons, films or sheets to be clamped into position, etc.

One object of the invention is to provide a new material for coverings which when wet may be placed in position to dry and which on drying exhibits a high degree of shrinkage.

Another object is to use material which is soluble, in a water solution, which is capable of being precipitated to form a film, and which is resoluble in the same solvent without detriment to the material for the desired purpose.

A particular object is the use of a cellulose hydroxy-alphyl ether for the covering material.

Various other objects and advantages of the invention will be apparent from the following description of the methods of making and using bottle caps, and the properties of said caps, having reference to the accompanying drawing in which:

Fig. 1 is a side elevation of a portion of a bottle and illustrating the initial condition of a cap; and Fig. 2 is a similar view showing the cap after it has given up its water of hydration and has shrunk over the stopper and neck of the bottle.

The present commercial self-shrinking bottle caps are made of gelatin or cellulose hydrate regenerated from viscose. It has also been proposed to make such caps of cellulose acetate but apparently such caps have not found commercial application.

I have found that a film of a hydroxy-alphyl ether of cellulose and especially a hydroxy ethyl ether of cellulose can be prepared and formed into suitable shape or form. This, when placed upon the bottle, jar, or vessel shrinks by loss of moisture and attaches itself spontaneously at numerous points of contact, forming a perfectly tight joint. Thus, for an ordinary stoppered bottle such as is shown in the accompanying figure, I mold these coverings of cellulose hydroxy-alphyl ether by coating the rounded and closed ends of cylindrical tubes with a solution of the ether in a dilute caustic alkali. I then precipitate the ether from the solution by means of a dilute acid or a salt. The films so formed are then detached, purified, and washed and preserved in contact with water in a hydrated condition, preferably having a small amount of anti-mold material present to prevent spoilage of the film. These films are made slightly larger than the neck of the bottle or vessel to be covered so that they slip on quite easily. The length is also adjusted according to requirements. The film when placed on a bottle or vessel shrinks on drying and readily accommodates itself to the shape of the vessel.

In Fig. 1 the cup-shaped film 1 is shown covering the stopper and neck of the bottle 2 prior to drying. Fig. 2 shows the dried film 3 after shrinking into position.

The hydroxy-alphyl ethers of cellulose used in my invention may be made as described in the pending application of A. W. Schorger, Serial No. 345,214, filed March 7, 1929, and subsequently abandoned after the subject matter thereof had been incorporated in five applications of the same inventor, identified as follows:

Serial Number 475,249__filed August 14, 1930
Serial Number 475,250__filed August 14, 1930
Serial Number 475,251__filed August 14, 1930
Serial Number 477,752__filed August 25, 1930
Serial Number 477,753__filed August 25, 1930

In said applications the ether is prepared by subjecting soda cellulose to the action of an olefine oxide. The oxides at the lower end of the series, that is, those of ethylene to amylene inclusive apparently produce the most practical cellulose derivatives. Of these the oxides of ethylene and propylene are preferred, especially the former, because it is now more available commercially and the cheaper of the two. The corresponding chlorohydrins, that is, the chlorine esters of corresponding glycols, may be used in place of the oxides. The chlorine esters of glycerol, especially alpha monochlorohydrin or glycerol monochlorohydrin, may also be used to produce a useful hydroxy-alphyl cellulose, the alpha monochlorohydrin producing a dihydroxy-propyl ether of cellulose as compared to the monohydroxy-propyl ether formed when propylene oxide reacts with soda cellulose. This ether resembles the hydroxy-ethyl ether closely.

When ethylene oxide or ethylene chlorohydrin is used it is preferable to keep the ethylene oxide content of the final product below 20% of the cellulose used or substantially less than one molecule of oxide to one unit of cellulose ($C_6H_{10}O_5$). In this range an ether containing less than one molecule of ethylene oxide to two units of cellulose is preferable and especially one containing 1 molecule of oxide to 3 to 4 units of cellulose, that is, from 7 to 9 percent. Such ethers high in cellulose are cheaper because of their relatively high cellulose content, are stronger, are more resistant chemically, are easier to handle, are insoluble in water, have a limited solubility in caustic soda solutions, that is, they are not soluble in all strengths of solutions and are practically insoluble in caustic potash solutions.

As an example of my invention, a hydroxy-ether containing from 7 to 9 percent of ethylene oxide is dissolved in a solution of 7½ to 8 percent sodium hydroxide so that the solution contains from 6 to 7 percent of the ether. Its viscosity is adjusted by regulating the age of the alkali cellulose as set forth in the said pending Schorger applications and as is well known to those skilled in the art of making cellulose esters and ethers. Other hydroxy-alphyl ethers may be used, the solutions being prepared with due regard for the varying properties of each ether.

The mold is dipped into the solution of the ether, is withdrawn, and immersed into a solution which precipitates the ether. This solution may be a dilute sulphuric acid or it may be any other suitable acid of combination of salts as is well known in the art. A solution containing 68% water, 20% sodium sulphate ($Na_2SO_4$) and 12% sulphuric acid ($H_2SO_4$) is suitable. In order to facilitate the removal of the caps from the molds, it is best to add to the cellulose ether solution from 1% to 2% of an alkali carbonate such as sodium carbonate or other salt yielding a gas by reaction with an acid in the precipitating bath. The caps may also be readily stripped from the molds if the molds are tapered. The cap after removal from the mold is washed free of acid and other salts. If necessary the caps are now bleached, suitably washed, and put into storage under sterile conditions as the material is subject to destruction by mold growth.

The ether may be dyed readily and opaque caps may be made by incorporating an inert pigment into the ether solution prior to the molding of the bottle caps.

Bottle caps made from the hydroxy-alphyl ethers of cellulose and especially those made from hydroxy-ethyl cellulose having a high proportion of cellulose, having a distinct advantage over those made from gelatin or from viscose. Although the gelatin caps are particularly desirable because of their very high shrinkage, nevertheless they have other properties which prevent their wide use. The gelatin caps are shipped dry and are soaked by the user in water for a certain time or until they swell to the desired size. This soaking operation requires much care since the longer they are soaked the larger they become. The temperature is also a factor. This property militates against the gelatin caps. Gelatin caps also are apt to shrink unevenly and to crack off, especially in a warm, dry place.

The cellulose hydrate caps made from viscose require a more complicated handling since the viscose solution after applying to the molds must first be set, then regenerated, then stripped from the molds, washed, desulfurized, bleached and trimmed. The cellulose hydrate caps are usually soaked in a 6% glycerine solution for a short time before use in order to prevent excessive brittleness when the caps dry. The cellulose hydrate caps develop 25% to 28% shrinkage and since 25% is practically the minimum shrinkage necessary for a neat fit on an average bottle, it can be seen that the cellulose hydrate caps have but a slight margin of safety. On the other hand caps made of the hydroxy ethers of cellulose having substantially less than one molecule of ethylene oxide to one unit of cellulose, (one unit being considered as $C_6H_{10}O_5$) have a shrinkage of about 35% and therefore have a much larger factor of safety. With this larger shrinkage a pigment may also be incorporated into the hydroxy ether without cutting down the shrinkage to below the desirable 25%. Furthermore the cellulose hydrate caps stretch only about 8 to 10% before tearing, whereas caps made of the elastic hydroxy-alphyl ethers of cellulose may be stretched to as much as 50% before tearing and yet retain the same ability to shrink; hence there is greater flexibility in the use of one size of cap on vessels having various sizes of tops. As hereinbefore described those ether caps composed of about one molecule of oxide to 3 to 4 units of cellulose have other excellent physical and chemical properties.

After drying the hydroxy ether of cellulose is much more pliable than the material made from viscose. As a result glycerine is not essential with the ether cap, whereas it is needed with the hydrated cellulose cap. The caps after being formed must be trimmed to proper length. This trimming often represents a loss in material because in the case of the hydrated cellulose it cannot be used for the preparation of a new solution. With the hydroxy ether of cellulose, the trimmings may be utilized in the preparation of more solution, such trimmings being redissolved in caustic soda.

In the foregoing and in the appended claims I have used the term "alphyl" as indicating a radical of the aliphatic series inasmuch as the term "alkyl" which is sometimes used to make this distinct reference is frequently indicative of both aliphatic and aromatic radicals. The term "alphyl" is specific to the aliphatic series in the same manner as "aryl" is specific to the aromatic series. See Richter's Organic Chemistry, vol. I, page 43, first English edition 1916.

I claim:

1. A hollow article or cap comprising a film of wet hydrated hydroxy-alphyl ether of cellulose containing substantially less than one hydroxy-alphyl radicle to one unit of cellulose, adapted, when placed upon a substantially similarly shaped surface, to shrink by loss of moisture and so attach itself firmly at numerous points of contact.

2. A hollow article or cap comprising a film of wet hydrated hydroxy-alphyl ether of cellulose containing less than one hydroxy-alphyl radicle to two units of cellulose, adapted, when placed upon a substantially similarly shaped surface, to shrink by loss of moisture and so attach itself firmly at numerous points of contact.

3. A hollow article or cap comprising a film of wet hydrated hydroxy-ethyl ether of cellulose containing substantially less than one hydroxy-ethyl molecule to one unit of cellulose, adapted, when placed upon a substantially similarly shaped surface, to shrink by loss of moisture and so attach itself firmly at numerous points of contact.

4. A hollow article or cap comprising a film of wet hydrated hydroxy-ethyl ether of cellulose containing less than one hydroxy-ethyl molecule to two units of cellulose, adapted, when placed upon a substantially similarly shaped surface, to shrink by loss of moisture and so attach itself firmly at numerous points of contact.

5. A hollow article or cap comprising a film of wet hydrated hydroxy-ethyl ether of cellulose containing one hydroxy-ethyl molecule to 3 to about 4 units of cellulose adapted, when placed upon a substantially similarly shaped surface, to shrink by loss of moisture and so attach itself firmly at numerous points of contact.

6. A hollow article or cap comprising a film of wet hydrated hydroxy-alphyl ether of cellulose containing less than one hydroxy-alphyl molecule from ethyl to propyl inclusive, to two units of cellulose, adapted, when placed upon a substantially similarly shaped surface, to shrink by loss of moisture and so attach itself firmly at numerous points of contact.

7. A circular covering for bottles and the like comprising a film of wet hydrated hydroxy-alphyl ether.

8. A circular covering for bottles and the like comprising a film of wet hydrated hydroxy-alphyl ether within the range of alphyl homologs from ethyl to propyl.

9. A circular covering for bottles and the like comprising a film of wet hydrated hydroxy-alphyl ether within the range of alphyl homologs from ethyl to propyl, said ether containing less than one alphyl group per unit $(C_6H_{10}O_5)$ of cellulose.

10. A film covering adapted to be placed in position while wet and to shrink and dry in place, comprising a film of wet hydrated hydroxy-alphyl ether within the range of alphyl homologs from ethyl to propyl, said ether containing less than one alphyl group per unit $(C_6H_{10}O_5)$ of cellulose.

11. An article of manufacture comprising an undried wet film of cellulose hydroxy-alphyl ether as a covering material to be applied wet for drying and shrinking into place.

In testimony whereof, I have subscribed my name.

MILTON J. SHOEMAKER.